UNITED STATES PATENT OFFICE.

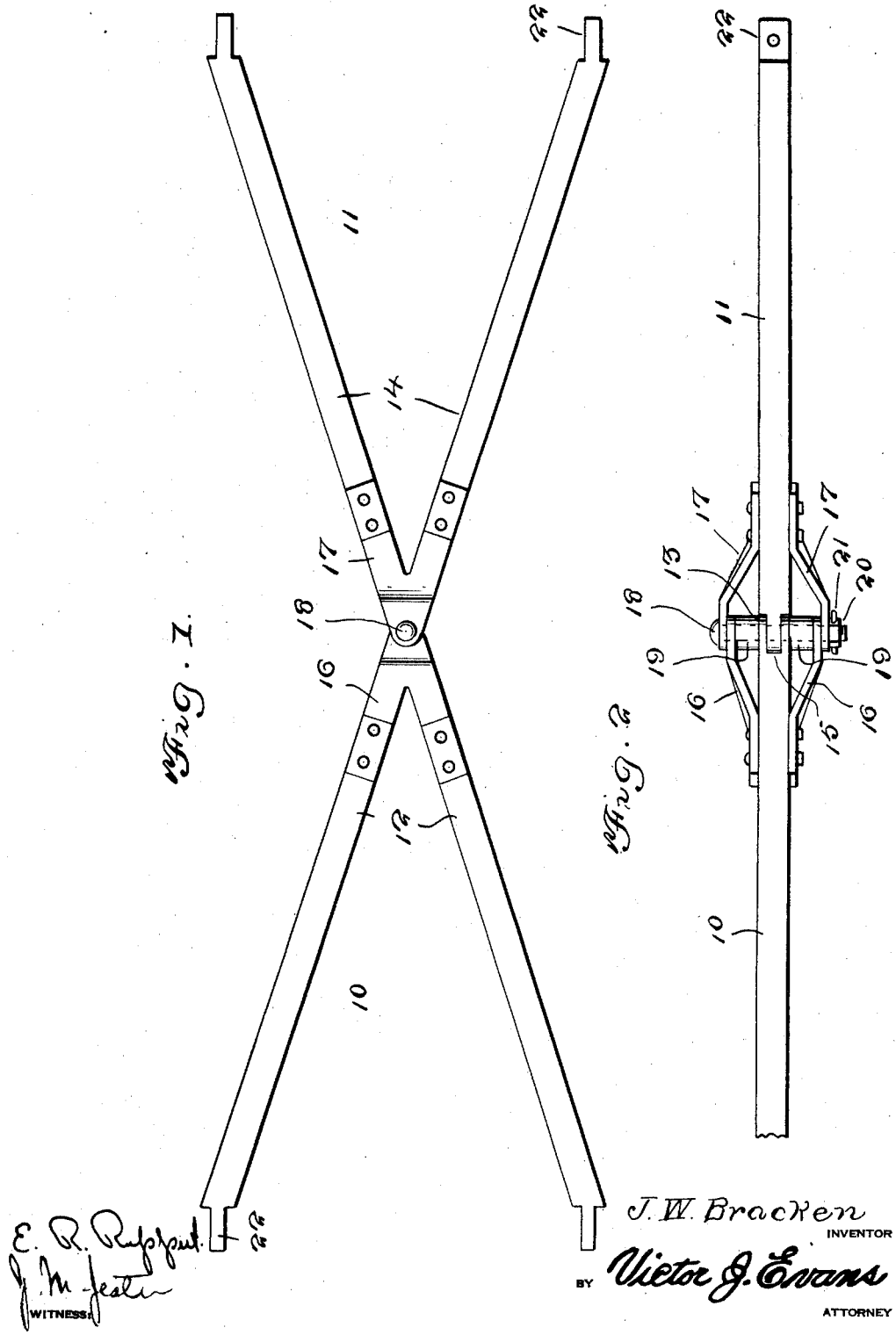

JOHN WYLY BRACKEN, OF MIAMI, FLORIDA.

DRAFT-COUPLING.

1,390,874.        Specification of Letters Patent.    Patented Sept. 13, 1921.

Application filed October 12, 1920. Serial No. 416,422.

*To all whom it may concern:*

Be it known that I, JOHN W. BRACKEN, a citizen of the United States, residing at Miami, in the county of Dade and State of Florida, have invented new and useful Improvements in Draft-Couplings, of which the following is a specification.

This invention relates to draft devices for coupling together a power vehicle and a trailer, such as a wagon or the like, the coupling being so constructed as to insure tracking of the vehicle trailed so as to avoid short turns and the like, it being of course the intention that the train of wagons or other trailers be coupled together by this coupling device as well as coupled to the motor truck or other vehicle doing the pulling.

An important object is the provision of a device of this character which is complete in itself and which is adapted for ready connection with vehicles.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a plan view of my device, and Fig. 2 is a side elevation.

Referring more particularly to the drawings I have shown my device as comprising pairs of V-shaped hounds designated broadly by the numerals 10 and 11. These hounds are similar in construction and the former includes a pair of converging arms 12 and has its vertex bifurcated to form spaced knuckles 13. The hounds 11 are formed of a pair of converging arms 14 and has its vertex formed with a reduced extension 15 engaged between the knuckles 13.

Secured upon the meeting ends of the bars 12 at the top and bottom faces thereof are offset brackets 16 and secured upon the meeting ends of the bars 14 at the upper and lower surfaces thereof are offset brackets 17. The brackets 17 have their offset portions engaging above and below the offset portions of the brackets 16 and I provide a pivot bolt 18 which passes through all of the brackets and also through the ears 13 and extension 15. Spacing sleeves 19 are disposed upon the pivot bolt 18 and engaged against the upper and lower surfaces of the hounds and against the adjacent faces of the offset brackets whereby to brace the structure. The bolt 18 is provided with a nut 20 through which passes a suitable cotter pin 21.

At their outer ends the bars 12 and 14 are formed with reduced lugs 22 adapted to be pivotally connected between suitable ears, not shown, provided on the vehicle being towed and the vehicle doing the towing.

In the use of the device it will be seen that the arms of the towing or pulling vehicle will be followed exactly by the vehicle being towed so that dragging or cutting of corners will be prevented.

While I have shown and described the preferred embodiment of my invention it is of course to be understood that I reserve the right to make such changes in the form, construction, and arrangement of parts as will not depart from the spirit of the invention or the scope of the subjoined claim.

Having thus described my invention, I claim:

A coupling device for the purpose specified comprising a pair of hounds each formed as a V-shaped bar having converging arms terminating at their outer ends in reduced extensions, the vertex of one bar being bifurcated to define spaced knuckles arranged in a horizontal plane, the vertex of the other bar being reduced to form an extension disposed between said knuckles, offset brackets secured upon the ends of all of said bars and mounted upon the upper and lower sides thereof, the brackets on one set of bars overlapping those on the other, spacing sleeves between said bars and said brackets, and a pivot bolt passing through the brackets, through the spacing sleeves and through said knuckles and extensions.

In testimony whereof I affix my signature.

JOHN WYLY BRACKEN.